(12) United States Patent
Tanaka et al.

(10) Patent No.: US 6,171,673 B1
(45) Date of Patent: Jan. 9, 2001

(54) COMPOSITIONS FOR PROTECTIVE FILMS AND OPTICAL RECORDING MEDIA

(75) Inventors: Mieko Tanaka; Hiraku Kominami; Kozaburo Hayashi, all of Tochigi (JP)

(73) Assignee: Sony Chemicals Corp., Tokyo (JP)

(*) Notice: Under 35 U.S.C. 154(b), the term of this patent shall be extended for 0 days.

(21) Appl. No.: 09/321,756

(22) Filed: May 28, 1999

(30) Foreign Application Priority Data

Jun. 1, 1998 (JP) .................................................. 10-151588

(51) Int. Cl.$^7$ ....................................................... B32B 3/02
(52) U.S. Cl. .................. 428/64.2; 428/447; 428/694 BP; 428/913
(58) Field of Search .............................. 428/64.1, 64.2, 428/64.4, 447, 694 BP, 913

(56) References Cited

U.S. PATENT DOCUMENTS

| | | |
|---|---|---|
| 4,500,447 | 2/1985 | Kobayashi et al. . |
| 5,776,668 | * 7/1998 | Oltean ................................... 430/523 |
| 5,830,577 | * 11/1998 | Murayama ......................... 428/411.1 |
| 5,932,330 | * 11/1998 | Ohkubo ................................ 428/216 |
| 5,932,340 | * 8/1999 | Sawaguchi ........................... 428/323 |

FOREIGN PATENT DOCUMENTS

| | | |
|---|---|---|
| 0 233 519 | 8/1987 | (EP) . |
| 0 780 241 | 6/1997 | (EP) . |
| 2-40149 | 2/1990 | (JP) . |
| 2-308445 | 12/1990 | (JP) . |
| 4-19842 | 1/1992 | (JP) . |
| 7-161088 | 6/1995 | (JP) . |
| WO 97/25389 | 7/1997 | (WO) . |

* cited by examiner

*Primary Examiner*—Elizabeth Evans
(74) *Attorney, Agent, or Firm*—Oliff & Berridge, PLC

(57) ABSTRACT

The present invention provides a protective film with high mechanical strength free from dust.

A protective film 14 of an optical recording medium 2 is formed by applying and curing a composition for protective films obtained by dispersing in a curable binder material a first lubricant compatible with said binder material and a second lubricant incompatible with said binder material but compatible with said first lubricant. The incompatible second lubricant is stably and homogeneously dispersed to enhance lubricity and slidability while any excessive amount of the lubricant does not deposit on the surface of the protective film. The binder material is desirably photocurable.

15 Claims, 1 Drawing Sheet

COMPOSITIONS FOR PROTECTIVE FILMS AND OPTICAL RECORDING MEDIA

FIELD OF THE INVENTION

The present invention relates to compositions for protective films, protective films obtained by curing them and optical recording media having said protective films, particularly to compositions with good lubricity and slidability for protective films, protective films obtained by curing them and optical recording media having said protective films.

PRIOR ART

Recently, optomagnetic recording media have been remarkably widespread as rewritable optical recording media. FIG. 1 shows such an optomagnetic recording medium in 2 having a transparent plastic substrate 10 such as a polycarbonate. On the transparent plastic substrate 10 are successively formed a first dielectric film 11, an optomagnetic recording film 12, a second dielectric film 13 made from a similar material to that of the first dielectric film 11 and a protective film 14.

When a datum is to be written into the optomagnetic recording medium 2 having the above structure, a magnetic head is entered into contact with the surface of the protective film 14 and the optomagnetic recording film 12 is irradiated with laser from the side of the transparent plastic substrate 10 to partially heat the optomagnetic recording film 12 to its Curie point, then allowed to cool down, during when recording signals are biased from the magnetic head to the optomagnetic recording film 12 so that the desired datum is written.

As the optomagnetic recording medium 2 turns at high speed, during then, the protective film 14 and the magnetic head slide on each other at high speed. Thus, the protective film 14 is desired to have a low friction coefficient. However, a protective film simply obtained by curing a binder material causes the magnetic head or the protective film to be worn or damaged.

Therefore, many attempts have been made to lower the friction coefficient of the protective film. For example, optomagnetic recording media in which a lubricant such as a silicone oil is added in a binder material such as a UV-curable resin have been developed (JPA Nos. 40149/90, 308445/90, 19842/92 and 161088/95).

However, protective films of such recording media still have insufficient characteristics, and the development of a protective film with higher lubricity and slidability is demanded.

In order to solve the above problems of the prior art, the present invention aims to provide a protective film with high lubricity and slidability, a composition capable of forming said protective film and an optical recording medium having said protective film.

SUMMARY OF THE INVENTION

We investigated the reason why protective films of the prior art are insufficient in lubricity and slidability from the viewpoint of combinations of binder materials and lubricants forming the protective films, and obtained the following findings.

If a binder material is used together with a lubricant incompatible with the binder material, the lubricant deposits on the surface of the resulting protective film to show good lubricity.

However, this combination has the drawback that the lubricity decreases with sliding cycles because the lubricant on the surface is wasted by sliding contact with the magnetic head.

A possible means to prevent the decrease of lubricity is to excessively add the lubricant, but the lubricant excessively added causes another problem, i.e. mechanical strength of the protective film is lowered and the excessive lubricant deposits on the surface to attract dust and dirt.

Furthermore, the liquid composition for such a protective film tends to phase-separate over time, so that a homogeneous protective film can not be prepared.

If a binder material is combined with a lubricant compatible with the binder material, the lubricant is taken up in the binder material to fail in an expected lubricity.

If the lubricant here is too excessively added to maintain the balance of compatibility, the lubricant deposits on the surface of the protective film to lower the strength or attract dirt as described above though the lubricity and slidability of the protective film increase.

On the other hand, optomagnetic recording media in which a layer consisting of a lubricant (i.e. lubricating film) is formed on the protective film have also been developed (JPA Nos. 128611/93, 176401/94 and 138589/95) rather than increasing the lubricity of the protective film. In these cases, the protective film itself has high mechanical strength and satisfactory lubricity and slidability, but the lubricating film is extremely sticky so that it tends to attract dust and dirt, which can not be removed once deposited to cause another problem such as crush.

This solution not only requires an additional step of forming a lubricating film on the protective film, but also inevitably involves the use of an organic solvent for diluting the lubricant to be applied as a thin and homogeneous lubricating film.

This concludes that a protective film formed from a binder material mixed with a lubricant incompatible with the binder material should require a technique for incorporating the lubricant incompatible with the binder material as much as possible without depositing on the surface.

Thus, we thought to obtain a composition for protective films in which a lubricant incompatible with the binder material is stabilized.

However, any method that a lubricant incompatible with the binder material is stably dispersed into a binder material has not been known. As a result of our careful studies, we found that, when a lubricant compatible with a binder material (hereinafter referred to as "first lubricant") and a lubricant incompatible with the binder material but compatible with the first lubricant (hereinafter referred to as "second lubricant") are mixed into the binder material, the second lubricant is homogeneously and stably dispersed in the binder material.

This is probably because the second lubricant is also dispersed when the first lubricant is homogeneously and stably dispersed in the binder material. The resulting dispersion including the so-called three-component system consisting of a binder material, a first lubricant and a second lubricant in good balance is thought to be very stable by the action of the first lubricant.

The dispersion can be used alone as a composition for protective films or can be added to other kinds of binder materials or the like to prepare a composition for protective films.

When the dispersion is used to be added to other kinds of binder material, the lubricity and slidability of protective films are improved with a slight amount. Thus, an optical recording medium with high lubricity and slidability can be attained simply by applying and curing the resulting composition for protective films on a recording film by a conventional procedure.

The present invention is based on the above findings, and a composition for protective films of present invention comprises a curable binder material, a first lubricant compatible with the binder material and a second lubricant incompatible with the binder material but compatible with the first lubricant.

As a composition for protective films of present invention, silicone lubricants are used for the first lubricant and the second lubricant.

For a composition for protective films of present invention, the first lubricant comprises one or more modified silicone oils selected from propylene oxide-modified silicone oils, ethylene oxide-modified silicone oils or propylene oxide and ethylene oxide-modified silicone oils.

When the above modified silicon oils are used for a first lubricant of a composition for protective films of present invention, the first lubricant is contained at a ratio of 3.0% by weight or less.

On the other hand, a second lubricant of a composition for protective films of present invention comprises an unmodified silicone oil based on dimethyl siloxane.

A composition for protective films of present invention can contain the modified silicone oil at a ratio of 0.01% by weight or more and 3.0% by weight or less.

In a composition for protective films of present invention, a UV-curable resin can be used for the binder material.

A protective film of present invention can be obtained by applying and curing the above composition for the protective film on a substrate.

The recording medium of present invention can be obtained by forming the above protective film on a recording film that can record information. The recording medium of present invention may include not only optical recording media using optomagnetic recording films for recording media but also optical recording media using optical recording films and recording media using magnetic recording films.

Figure 1:
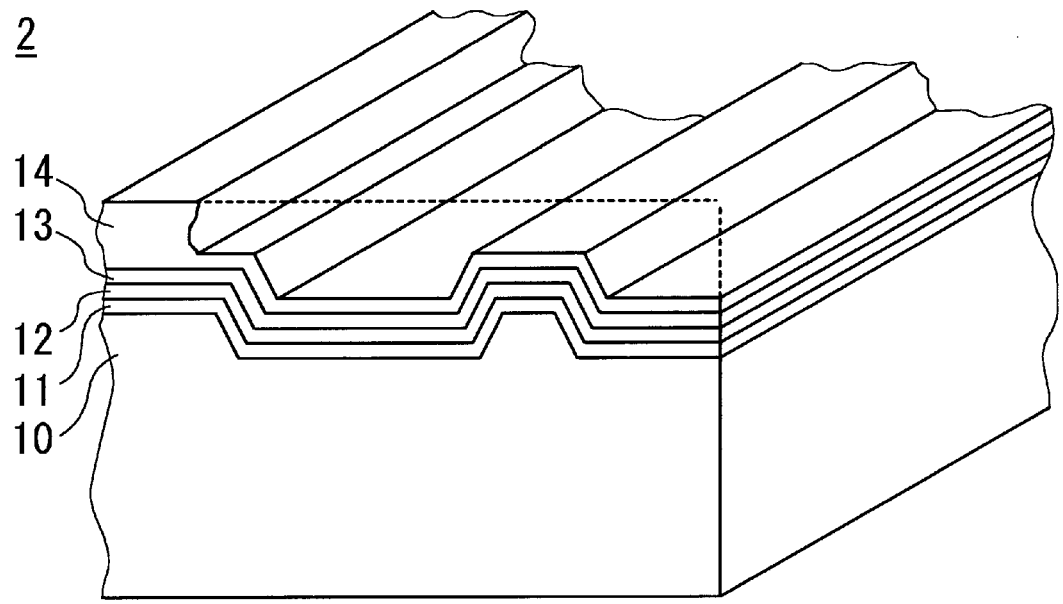
FIG. 1 illustrates the structure of an optical recording medium.

Numeral references represent the following elements: 2: optical recording medium; 10: transparent plastic substrate; 11, 13: dielectric film; 12: optomagnetic recording film; 14: protective film.

DETAILED DESCRIPTION OF THE INVENTION

Compositions for protective films of the present invention comprise a binder material, a first lubricant compatible with the binder material and a second lubricant incompatible with the binder material but compatible with the first lubricant, wherein the first and second lubricants are dispersed in the binder material.

In order to form a protective film of the present invention, the second lubricant is dispersed in the binder material. Therefore, it is convenient to use the binder material in liquid state but the binder material can also be liquidized material obtained by dilution with an organic solvent or the like.

Liquid binder materials should be cured when a protective film is formed. Suitable binder materials may be heat-curable, but preferably radiation-curable with UV rays or the like.

From this point of view, preferred binder materials in compositions for protective films of the present invention are monomers or oligomers.

Suitable monomers are mentioned in, for example, "Introduction to UV-Curing Techniques", cowritten by Nakahara and Kato, Polymer Publishers, pp. 46–48. Suitable oligomers are mentioned in, for example, page 57 of Nakahara et al., ditto.

Solid oligomers may conveniently be made liquid by dilution with a monomer thereof.

In the present invention, the first and second lubricants are selected in combination with the binder material used.

A lubricant is considered to be compatible with the binder material used when it does not separate over time after it is mixed at a ratio of 3.0% by weight and thoroughly agitated. On the contrary, a lubricant is considered to be incompatible when it forms a milky turbidity even if it is thoroughly agitated or it phase-separates over time.

When the binder material is a monomer, suitable first lubricants compatible with the binder material are modified silicone oils. For example, polyether-modified silicone oils such as ethylene oxide-modified silicone oils, propylene oxide-modified silicone oils, or propylene oxide and ethylene oxide-modified silicone oils, or phenyl-modified silicone oils may be used.

Suitable second lubricants incompatible with the binder material are unmodified silicone oils such as dimethyl silicone oils.

The first and second lubricants should be compatible with each other. As to the compatibility between lubricants, one is considered to be compatible with the other when such a combination neither forms any milky turbidity nor separates over time after the one is agitated in the other at a ratio of 3.0% by weight. In order that two lubricants should be compatible with each other, those having basically similar chemical structures may generally be used.

When the binder is a monomer and the first lubricant is a polyether-modified silicone oil, the second lubricant may be a dimethyl polysiloxane or fluorine-modified silicone oil, for example.

In the formulation of a protective film, the ratios of the three components, i.e. a binder material, a first lubricant and a second lubricant depend on the nature of each component, but typically 0.01 to 3.0% by weight of a first lubricant and 0.01 to 3.0% by weight of a second lubricant are contained on the basis of the total weight of the binder material and the first and second lubricants.

EXAMPLES

Preparation Process

Then, a process for preparing a composition for protective films of the present invention is described.

Initially, 5 to 15 parts by weight of a first lubricant and 5 to 50 parts by weight of a second lubricant are dispersed in 30 to 70 parts by weight of a binder material using a homogenizer to prepare a dispersion.

The resulting dispersion can be added into the same or a different type of binder material to prepare a composition for protective films of the present invention. If the same type of binder material is used, any redispersion process is not needed to mix the dispersion.

The binder material used as the solution into which the dispersion is added must be compatible with the first lubricant but incompatible with the second lubricant.

A part of the first or second lubricant may have preliminarily been added to the solution.

In brief, 0.01 to 3.0 parts by weight of a first lubricant and 0.01 to 3.0 parts by weight of a second lubricant can be contained on the basis of the total weight of the binder material used and the dispersed materials to form a protective film having satisfactory lubricity and slidability while neither first nor second lubricant excessively deposits on the surface of the protective film.

If the binder material used in the protective film of the present invention is a monomer or an oligomer, a photoinitiator can be added to accelerate polymerization. Suitable photoinitiators are mentioned in, for example, Table 22 at page 62 of Nakahara et al., ditto.

In the present invention, fillers, pigments, metal powders, antioxidants and ion exchangers can be added so far as the effects of the present invention are not compromised.

The resulting composition for protective films can be applied on a recording film or a dielectric film of an optical recording medium by a conventional procedure, i.e. using a coating means such as the spin coating or the screen printing, and then cured to form a protective film of the present invention.

The following examples further illustrate the preparation process and characteristics of the resulting protective films.

Example 1

(1) Preparation of a Dispersion

Using a bifunctional monomer (NPGDA, available from Nippon Kayaku Co., Ltd.) as a binder material (A) for forming protective films, an ethylene oxide-modified silicone oil compatible with the binder material (A) (TSF 4441, available from Toshiba Silicone Co., Ltd.) as a first lubricant and a dimethyl siloxane incompatible with said binder material (A) but compatible with the first lubricant (KF96, available from Shin-Etsu Chemical Co., Ltd.) as a second lubricant, an emulsion of 10 parts by weight of the first lubricant and 30 parts by weight of the second lubricant in 50 parts by weight of the binder (A) was disperesed for a few minutes using a homogenizer to give an intended dispersion.

(2) Preparation of a Composition For Protective Films

A polyfunctional oligomer compatible with the first lubricant but incompatible with the second lubricant (Aronix M6250, available from Toagosei Co., Ltd.) was used as a binder material (B) of a different type from that of the binder (A), and 0.2 parts by weight of the dispersion prepared as above was added dropwise into a mixture of 30 parts by weight of the binder material (B), 1.3 parts by weight of the first lubricant and minor amounts of an initiator (Irgacure 184, available from Ciba Specialty Chemicals K.K.) in 80 parts by weight of the binder material (A) used for the dispersion to give an intended composition for protective films.

(3) Preparation of an Optical Recording Medium

After a transparent dielectric film, an optomagnetic recording film and a transparent dielectric film were formed on a polycarbonate substrate, the composition prepared by the above procedure was added dropwise on the uppermost transparent dielectric film and the polycarbonate substrate was rotated at 2500 RPM on a spin coater to form a dispersion film of 10 $\mu$m in thickness, which was then irradiated with UV rays at a dose of 300 mJ/cm$^2$ to form a protective film.

Characteristics of the optical recording medium on which said protective film was formed were determined.

(4) Characteristics a. Determination of the Friction Coefficient

The average friction coefficient was determined after 3000 turns of said recording medium at a linear velocity of 1.4 m/sec with the protective film being in contact with a dummy head having a load of 2g.

b. Removal of Dust and Dirt

After the friction coefficient has been determined, the optical recording medium was allowed to stand in a room with the protective film upward for 24 hours so that dust and dirt were deposited. Then, air was blown against the surface of the protective film to visually observe whether or not the dust and dirt were removed.

c. Results

Evaluation results are shown in the following Table 1. Each content represents the ratio based on the total weight of the binder material used and the first and second lubricants.

TABLE 1

| | | Evaluation Results | | | | |
|---|---|---|---|---|---|---|
| | Dispersion (part by weight) | Content of lubricant elements in protective film | Friction coefficient | Removal of dust and dirt | First lubricant | Second lubricant |
| Example 1 | 0.2 | 1.3 | 0.44 | ○ | 1.24 | 0.06 |
| Example 2 | 0.5 | 1.5 | 0.42 | ○ | 1.32 | 0.18 |
| Example 3 | 1.0 | 1.7 | 0.38 | ○ | 1.40 | 0.30 |
| Example 4 | 2.0 | 2.2 | 0.30 | ○ | 1.60 | 0.60 |
| Example 5 | 2.0 | 2.2 | 0.30 | ○ | 1.60 | 0.60 |
| Comparative Example 1 | — | 1.2 | 0.50 | ○ | 1.20 | 0 |
| Comparative Example 2 | — | 6.7 | 0.46 | X | 6.70 | 0 |
| Comparative Example 3 | A lubricant layer is formed on the protective film. | The lubricant layer contains 100% by weight of lubricant. | 0.30 | X | — | — |

○: Removed.
X: Not removed.

The resulting protective film showed a practically satisfactory friction coefficient of 0.44 and good removal of dust and dirt in spite of the low total lubricant content of 1.3% by weight.

Examples 2–4

Protective films were formed and evaluated under the same conditions as in Example 1 except that the contents of the first and second lubricants were changed. The contents of the first and second lubricants and evaluation results are shown in the above Table 1.

The protective films of Examples 2, 3 and 4 showed good lubricity and slidability as demonstrated by the low friction coefficients of 0.42 to 0.30 in spite of the low lubricant contents of 1.5, 1.7 and 2.2% by weight, respectively.

Removal of dust and dirt was also good.

Example 5

The binder material for protective films prepared in Example 4 was added into the dispersion prepared in Example 4 to prepare an intended composition for protective films. A protective film was formed and evaluated by the same procedure as in Example 4. The contents of the first and second lubricants and evaluation results are shown in the above Table 1.

In Example 5, the composition for protective films was prepared in the reverse order to that of Example 4, but the results were not especially different and an optical recording medium with excellent lubricity and slidability was obtained.

Figure 2:
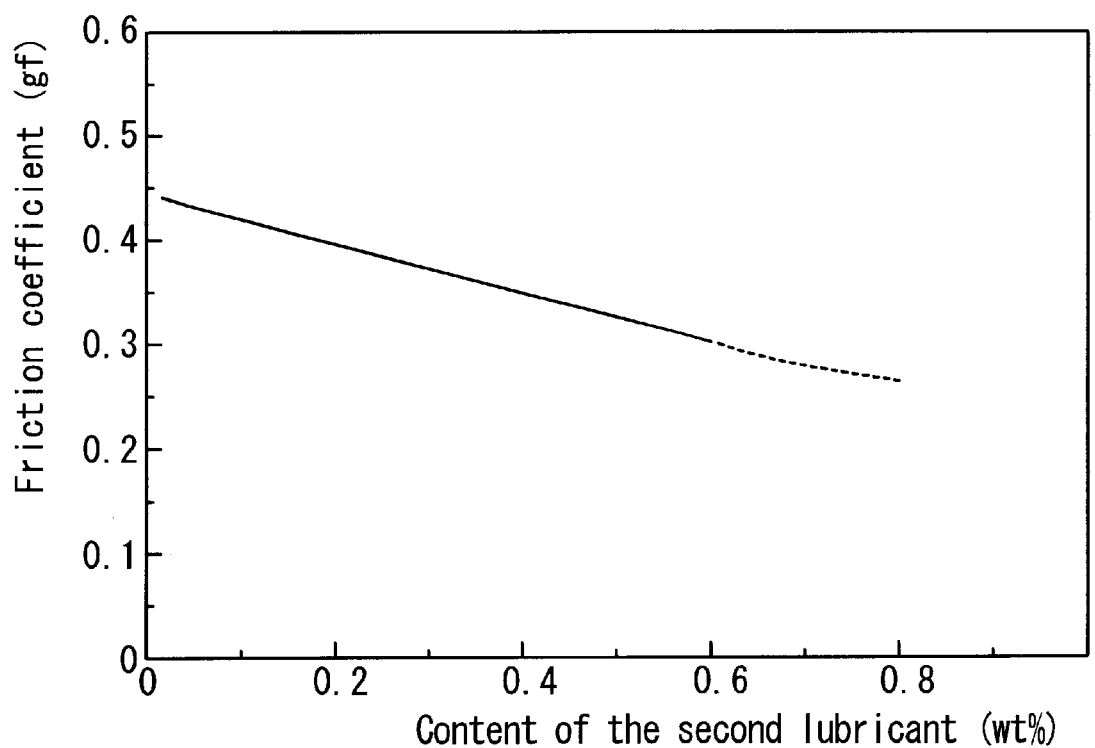
FIG. 2 is a graph showing the relationship between the lubricant content and the frictional force.

The relationship between the friction coefficient and the content of the second lubricant in Examples 1–5 is shown in the graph of FIG. 2. The friction coefficient decreases with the increase of the content.

Comparative examples are described below.

COMPARATIVE EXAMPLE 1

In 80 parts by weight of the binder material (A) and 30 parts by weight of the binder material (B) were mixed 1.3 parts by weight of the first lubricant used in Example 1 and minor amounts of an initiator (Irgacure 184) to prepare an intended composition for protective films. Evaluations were made in the same manner as in Example 1. Results are shown in the above Table 1.

The protective film of Comparative example 1 in which the second lubricant was not added was poor in lubricity and slidability as demonstrated by the high friction coefficient of 0.5.

COMPARATIVE EXAMPLE 2

The same binder materials (A) and (B) and first lubricant as used in Example 1 were mixed in amounts of 80, 30 and 7.4 parts by weight, respectively with minor amounts of an initiator (Irgacure 184) to prepare an intended composition for protective films under the same conditions as in Example 1. Evaluations were made in the same manner as in Example 1. Results are shown in the above Table 1.

The protective film of Comparative example 2 was somewhat poor in lubricity and slidability as demonstrated by the high friction coefficient of 0.46 in spite of the high lubricant content of 6.7% by weight.

Dust and dirt were not sufficiently removed and there was a great danger that crush or other problems may occur.

COMPARATIVE EXAMPLE 3

The first lubricant was used to prepare a lubricating film on the protective film of the optical recording medium of Comparative example 1. Evaluations were made in the same manner as in Example 1. Results are shown in the above Table 1.

The friction coefficient was as low as 0.3 because the evaluation results here report on the lubricating film, but not the protective film itself. However, the first lubricant dimethyl siloxane was liquid on the surface of as the protective film so that a plenty of dust and dirt were deposited and could not be removed.

ADVANTAGES OF THE INVENTION

Compositions for protective films of the present invention have a high lubricity because the second lubricant incompatible with the binder material is stably dispersed in the binder material.

Moreover, compositions for protective films prepared by diluting or by adding such a lubricating composition into the same or a different type of binder material can have a lower friction coefficient with less amounts of lubricants. Therefore, they are especially useful for protective films of optomagnetic disks.

Optomagnetic recording media having such a protective film have a higher reliability because magnetic heads or recording films are not damaged.

What is claimed is:

1. A composition for protective films, comprising a curable binder material, a first lubricant compatible with said binder material and a second lubricant incompatible with said binder material but compatible with said first lubricant.

2. A composition for protective films according to claim 1, wherein said first lubricant and said second lubricant are silicone lubricants.

3. A composition for protective films according to claim 2, wherein said first lubricant comprises one or more modified silicone oils selected from propylene oxide-modified silicone oils, ethylene oxide-modified silicone oils or propylene oxide and ethylene oxide-modified silicone oils.

4. A composition for protective films according to claim 3, wherein said first lubricant is contained at a ratio of 3.0% by weight or less.

5. A composition for protective films according to claim 3, wherein said second lubricant comprises one or more unmodified silicone oils selected from unmodified silicone oils based on dimethyl siloxane.

6. A composition for protective films according to claim 4, wherein said second lubricant comprises one or more unmodified silicone oils selected from unmodified silicone oils based on dimethyl siloxane.

7. A composition for protective films according to claim 5, wherein said second lubricant is contained at a ratio of 0.01% by weight or more and 3.0% by weight or less.

8. A composition for protective films according to claim 6, wherein said second lubricant is contained at a ratio of 0.01% by weight or more and 3.0% by weight or less.

9. A composition for protective films according to claim 8, wherein said binder material is a UV-curable resin.

10. A protective film comprising a curable binder material, and a first and a second lubricants dispersed in said binder material, and formed by curing said binder material, wherein:

said first lubricant comprises a material compatible with said binder material before cured, and said second lubricant comprises a material incompatible with said binder material before cured but compatible with said first lubricant.

11. A protective film according to claim 10, wherein said first lubricant comprises one or more modified silicone oils selected from propylene oxide-modified silicone oils, ethylene oxide-modified silicone oils or propylene oxide and ethylene oxide-modified silicone oils.

12. A protective film according to claim 11, wherein said second lubricant comprises one or more unmodified silicone oils selected from unmodified silicone oils based on dimethyl siloxane.

13. A recording medium comprising a recording film and a protective film formed on said recording film, wherein:
   said protective film is formed by curing a composition for protective films comprising a binder and a first and a second lubricants dispersed in said binder material,
   said first lubricant comprises a material compatible with said binder material, and
   said second lubricant comprises a material incompatible with said binder material but compatible with said first lubricant.

14. A recording medium according to claim 13, wherein said first lubricant comprises one or more modified silicone oils selected from propylene oxide-modified silicone oils, ethylene oxide-modified silicone oils or propylene oxide and ethylene oxide-modified silicone oils.

15. A recording medium according to claim 13, wherein said first lubricant comprises one or more modified silicone oils selected from propylene oxide-modified silicone oils, ethylene oxide-modified silicone oils or propylene oxide and ethylene oxide-modified silicone oils, and
   said second lubricant comprises one or more unmodified silicone oils selected from unmodified silicone oils based on dimethyl siloxane.

* * * * *